(12) United States Patent
Chen et al.

(10) Patent No.: US 9,933,036 B2
(45) Date of Patent: Apr. 3, 2018

(54) DAMPING RUBBER SPRING FOR AN AUTOMOBILE SUSPENSION

(71) Applicant: AVIC BEIJING INSTITUTE OF AERONAUTICAL MATERIALS, Beijing (CN)

(72) Inventors: Gaosheng Chen, Beijing (CN); Honggang Jiang, Beijing (CN); Gaolin Pei, Beijing (CN); Liangqing Lai, Beijing (CN); Chunchao Tu, Beijing (CN); Zhian Mi, Beijing (CN); Jia Liu, Beijing (CN); Jinghe Wang, Beijing (CN); Zhengtao Su, Beijing (CN)

(73) Assignee: AVIC BEIJING INSTITUTE OF AERONAUTICAL MATERIALS, Beijing (CN)

( * ) Notice: Subject to any disclaimer, the term of this patent is extended or adjusted under 35 U.S.C. 154(b) by 1 day.

(21) Appl. No.: 14/424,549

(22) PCT Filed: Aug. 28, 2013

(86) PCT No.: PCT/CN2013/082462
§ 371 (c)(1),
(2) Date: Feb. 27, 2015

(87) PCT Pub. No.: WO2014/032590
PCT Pub. Date: Mar. 6, 2014

(65) Prior Publication Data
US 2015/0226280 A1    Aug. 13, 2015

(30) Foreign Application Priority Data

Aug. 28, 2012   (CN) .......................... 2012 1 0311008

(51) Int. Cl.
*F16F 1/40*   (2006.01)
*B60G 11/22*   (2006.01)

(52) U.S. Cl.
CPC ................ *F16F 1/40* (2013.01); *B60G 11/22* (2013.01); *B60G 2202/14* (2013.01)

(58) Field of Classification Search
CPC .................................... F16F 1/40; B60G 11/22
(Continued)

(56) References Cited

U.S. PATENT DOCUMENTS 2,685,425 A * 8/1954 Wallerstein, Jr. ......... F16F 3/10
248/614
2,763,379 A * 9/1956 Danielson ................ B61G 9/14
213/45

(Continued)

FOREIGN PATENT DOCUMENTS

CN   102518726   6/2012
CN   102829115   12/2012
(Continued)

OTHER PUBLICATIONS

PCT/CN2013/082462, International Search Report, dated Nov. 7, 2013, 3 pages I English; 5 pages—Chinese.

*Primary Examiner* — Bradley T King
*Assistant Examiner* — James K Hsiao
(74) *Attorney, Agent, or Firm* — Andrew F. Young, Esq.; Lackenbach Siegel, LLP

(57) ABSTRACT

A damping rubber spring for an automobile suspension, including: n rubber layers (2), n being a natural number not less than 3; n+1 metal partition layers (1) including an upper partition layer (4) and a lower partition layer (5), the n rubber layers (2) and the n+1 metal partition layers (1) being laminated alternately with each other, and the upper partition layer (4) being disposed in parallel with the lower partition layer (5), wherein an m-th rubber layer (2) starting from the upper partition layer (4) has a thickness or cross section area (Continued)

that is the same as that of an m-th rubber layer (2) starting from the lower partition layer (5).

22 Claims, 3 Drawing Sheets

(58) Field of Classification Search
USPC .......................................................... 267/294
See application file for complete search history.

(56) References Cited

U.S. PATENT DOCUMENTS

| | | | | |
|---|---|---|---|---|
| 3,327,812 A * | 6/1967 | Lazan | ................ | F16F 1/40 188/268 |
| 3,467,353 A * | 9/1969 | Peterson | ................ | F16F 1/38 138/143 |
| 3,539,170 A * | 11/1970 | Hamel | ................ | B60G 11/22 105/198.7 |
| 3,575,403 A * | 4/1971 | Hamel | ................ | B61F 5/305 105/198.7 |
| 3,731,913 A * | 5/1973 | Hirst | ................ | B61F 5/305 267/294 |
| 3,797,851 A * | 3/1974 | Hirst | ................ | B60G 11/22 267/294 |
| 4,348,015 A * | 9/1982 | Domer | ................ | F16F 3/0935 267/140.4 |
| 4,416,203 A * | 11/1983 | Sherrick | ................ | B61F 5/305 105/224.1 |
| 4,593,502 A * | 6/1986 | Buckle | ................ | E04B 1/98 52/167.7 |
| 4,615,513 A * | 10/1986 | Thaung | ................ | B60G 5/053 267/141 |
| 4,754,958 A * | 7/1988 | Markowski | ................ | B64C 27/35 244/17.27 |
| 4,830,927 A * | 5/1989 | Fukahori | ................ | B32B 25/04 248/609 |
| 5,104,101 A * | 4/1992 | Anderson | ................ | F16F 13/06 188/298 |
| 5,228,664 A * | 7/1993 | Moulinet | ................ | F16C 7/04 248/632 |
| 5,299,790 A * | 4/1994 | Whightsil, Sr. | ....... | E21B 19/006 267/141.2 |
| 5,641,153 A * | 6/1997 | Gwinn | ................ | B60G 13/02 267/140.13 |
| 5,676,356 A * | 10/1997 | Ekonen | ................ | B60G 5/053 248/634 |
| 5,765,322 A * | 6/1998 | Kubo | ................ | E04H 9/022 248/634 |
| 5,833,038 A * | 11/1998 | Sheiba | ................ | F16F 1/40 188/378 |
| 6,045,328 A * | 4/2000 | Jones | ................ | F16F 13/105 248/562 |
| 6,276,674 B1 * | 8/2001 | Randell | ................ | F16F 1/3713 267/140.13 |
| 6,443,439 B1 * | 9/2002 | Newman | ................ | F16F 1/40 267/140 |
| 6,659,438 B2 * | 12/2003 | Michael | ................ | F16F 1/406 267/153 |
| 7,234,723 B2 * | 6/2007 | Sellers | ................ | B60G 9/00 280/124.17 |
| 8,256,795 B2 * | 9/2012 | Moriyama | ................ | B60G 5/04 267/140.3 |
| 8,317,173 B2 * | 11/2012 | Kawada | ................ | F16F 1/40 248/575 |
| 8,356,807 B2 * | 1/2013 | Kerr | ................ | B60G 13/02 213/40 R |
| 8,418,999 B2 * | 4/2013 | Kawada | ................ | F16F 1/406 267/140.11 |
| D699,637 S * | 2/2014 | Noble | ................ | D12/160 |
| D700,112 S * | 2/2014 | Noble | ................ | D12/160 |
| 9,091,322 B2 * | 7/2015 | Wang | ................ | F16F 15/04 |
| 9,150,071 B2 * | 10/2015 | Noble | ................ | B60G 5/02 |
| 2004/0113338 A1 * | 6/2004 | Wietharn | ................ | B60G 11/22 267/141.1 |
| 2009/0218740 A1 * | 9/2009 | Gedenk | ................ | B61F 5/305 267/294 |
| 2010/0044992 A1 * | 2/2010 | Noble | ................ | B60G 5/02 280/124.178 |
| 2010/0270719 A1 * | 10/2010 | Ranum | ................ | B60G 5/053 267/294 |
| 2011/0031662 A1 * | 2/2011 | Toyama | ................ | B61F 5/02 267/121 |
| 2011/0057407 A1 * | 3/2011 | Noble | ................ | F16F 1/373 280/124.1 |
| 2012/0001373 A1 * | 1/2012 | McLaughlin | ........... | F16F 1/403 267/141.1 |
| 2012/0292840 A1 * | 11/2012 | Mitsch | ................ | F03D 11/00 267/141 |
| 2012/0326366 A1 * | 12/2012 | Kawada | ................ | F16F 1/40 267/140.5 |
| 2015/0217616 A1 * | 8/2015 | Pei | ................ | B60G 11/22 267/294 |

FOREIGN PATENT DOCUMENTS

DE 1021008 12/1957
JP 54030371 A * 3/1979

* cited by examiner

DAMPING RUBBER SPRING FOR AN AUTOMOBILE SUSPENSION

CROSS REFERENCE TO RELATED APPLICATIONS

This application claims priority from PCT Ser. No. PCT/CN2013/082462 filed Aug. 28, 2013, the entire contents of which are incorporated herein, which in turn claims priority to China Ser. No. 201210311008.0 filed Aug. 28, 2012.

FIELD OF THE INVENTION

The present invention relates to a damping technology for automobile, and specially, to a damping rubber spring for an automobile suspension.

BACKGROUND OF THE INVENTION

A suspension rubber spring, which is a main bearing component and a key component for a new style rubber suspension of a heavy-duty vehicle, is comprised of metal and rubber layers, wherein the metal acts as a frame and a support, and the rubber acts as a buffer and a connection.

A rubber spring is used to connect an axle and a frame of a vehicle, support a weight of a vehicle body, absorb and eliminate vibration, increase friction forces between tyres and the ground as much as possible, ensure steering stability, improve automobile driving smoothness, decrease dynamic load on the vehicle body, increase service life of a automobile, and ensure comfortability of a passenger.

In recent years, products relating to road vehicle rubber suspension have been developed, and some of them have been experimented. However, assembling technologies of such suspension rubber springs are not mature, and structures of such suspension rubber springs are not perfect, such that rubber parts of the suspension rubber springs tend to have fatigue failure during use and thereby service life of such suspension rubber springs is relatively short.

Currently, service life of suspension rubber springs having a similar structure does not exceed 5,000 km when used in a heavy duty truck at home and abroad. A specific failure takes the form of crackles in an outer edge of each rubber layer, and the crackles are deeper in an outer edge of each rubber layer connecting with upper and lower partition layers, which leads to a worst damage.

SUMMARY OF THE INVENTION

The present invention is proposed to provide a damping rubber spring for an automobile suspension that has a good fragile resistance and a long service life.

According to one aspect of the present invention, there is provided an damping rubber spring for an automobile suspension comprising: n rubber layers, n being a natural number not less than 3; n+1 metal partition layers comprising an upper partition layer located at an uppermost position of the damping rubber spring for an automobile suspension and a lower partition layer located at a lowermost position of the damping rubber spring for an automobile suspension, the n rubber layers and the n+1 metal partition layers being laminated alternately with each other, and the upper partition layer being disposed in parallel with the lower partition layer, wherein an m-th rubber layer starting from the upper partition layer has a thickness that is the same as that of an m-th rubber layer starting from the lower partition layer, and wherein m is a natural number smaller than n.

Advantageously, in the above damping rubber spring for an automobile suspension, when n is an odd number, the thickness of a center rubber layer is larger than those of other rubber layers. Advantageously, the thicknesses of rubber layers on the upper and lower sides of the center rubber layer gradually decrease towards the upper partition layer and the lower partition layer respectively. Advantageously, a difference ratio between the thicknesses of adjacent two rubber layers does not exceed 30%.

Optionally and advantageously, in the above damping rubber spring for an automobile suspension, when 11 is an even number, two center rubber layers have the same thickness that is larger than those of other rubber layers. Advantageously, the thicknesses of rubber layers on the upper and lower sides of the two center rubber layers gradually decrease towards the upper partition layer and the lower partition layer respectively. Advantageously, a difference ratio between the thicknesses of adjacent two rubber layers does not exceed 30%.

Optionally, in the above damping rubber spring for an automobile suspension, each of the rubber layers has the same cross section area.

According to another aspect of the present invention, there is provided a damping rubber spring for an automobile suspension, comprising: n rubber layers, n being a natural number not less than 3; n+1 metal partition layers comprising an upper partition layer located at an uppermost position of the damping rubber spring for an automobile suspension and a lower partition layer located at a lowermost position of the damping rubber spring for an automobile suspension, the n rubber layers and the n+1 metal partition layers being laminated alternately with each other, and the upper partition layer being disposed in parallel with the lower partition layer, wherein an m-th rubber layer starting from the upper partition layer has a cross section area that is the same as that of an m-th rubber layer starting from the lower partition layer, where m is a natural number smaller than n.

Advantageously, in the above damping rubber spring for an automobile suspension, the rubber layer adjacent to the upper partition layer and the rubber layer adjacent to the lower partition layer have the same cross section area which is larger than those of other rubber layers.

Advantageously, in the damping rubber spring for an automobile suspension, when n is an odd number, the cross section area of a center rubber layer in the n rubber layers is smaller than those of other rubber layers. Further advantageously, the cross section areas of rubber layers gradually increase towards corresponding upper and lower partition layers respectively from the center rubber layer. Advantageously, a difference ratio between the cross section areas of adjacent two rubber layers does not exceed 30%.

Optionally and advantageously, in the damping rubber spring for an automobile suspension, when n is an even number, two center rubber layers have the same cross section area which is smaller than those of other rubber layers. Further advantageously, the cross section areas of rubber layers gradually increase towards corresponding upper and lower partition layers respectively from the two center rubber layers. Advantageously, a difference ratio between the cross section areas of adjacent two rubber layers does not exceed 30%.

Optionally, in the above damping rubber spring for an automobile suspension, the thickness of each rubber layer is the same.

Advantageously, at least one rubber layer is provided with an axial hole. Further, the axial hole extends through at least one metal partition layer. Still further, the axial hole extends through all the metal partition layers and the rubber layers. Optionally, an axis of the axial hole extends through geometrical centers of each metal partition layer and each rubber layer, the cross section normal to the axis of the axial hole is in a shape of circle, and a ratio between the diameter of the circle and the diameter of the smallest cross section of all the rubber layers normal to the axis is not larger than 0.3.

Advantageously, a connecting edge between the rubber layer and the metal partition layer is provided with a transitional chamfer. Further advantageously, an extending length of a curve of a transitional section of the transitional chamfer formed in a cross section is in a range from 0.5 mm to 20 mm.

With the technical solution of the present invention, fragile resistance of the rubber spring can be considerably increased, and thus a service life of the rubber spring can be extended. It has been proven by experiments that, when the damping rubber spring for an automobile suspension according to the present invention is mounted in a vehicle, a service life of the rubber spring may be more than 25,000 km, which is extended by 400% in contrast to those of existing rubber springs, and the technical effect thereof is prominent. Furthermore, the damping rubber spring for an automobile suspension according to the present invention may improve automobile driving smoothness, decrease dynamic load on the vehicle body, and improve comfortability of a passenger.

BRIEF DESCRIPTION OF THE DRAWINGS

The present invention is further described in connection with attached drawings and specific embodiments so as to provide an obvious and readily understanding of objects, characteristics and advantages of the invention, in which.

Figure 1:
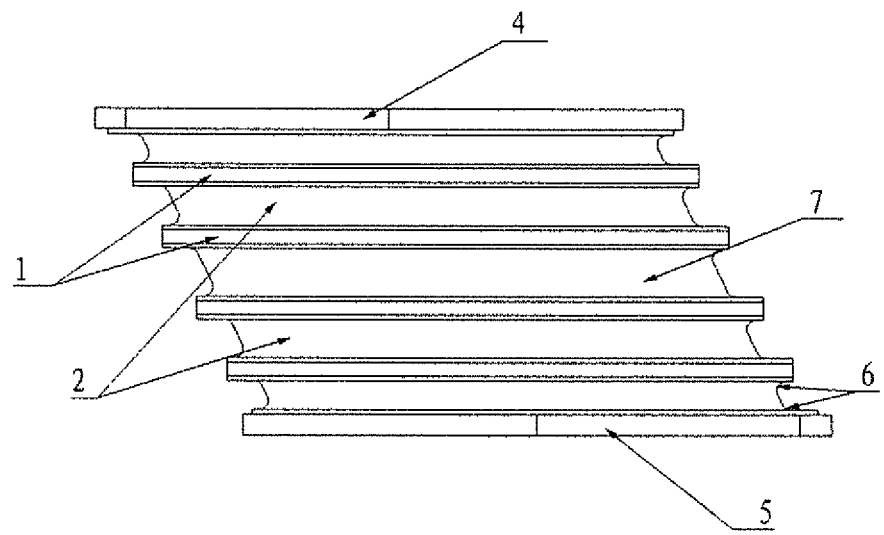
FIG. 1 is a front view showing a damping rubber spring for an automobile suspension according to an exemplary embodiment of the present invention.

A list of components in these figures:
1: metal partition layer
2: rubber layer
3: axial hole
4: upper partition layer
5: lower partition layer
6: transitional chamfer
7: center rubber layer
8: m-th rubber layer
9: suspension mount
10: balance beam
A: damping rubber spring for an automobile suspension
B: auxiliary rubber spring for an automobile suspension

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The embodiments described with reference to the attached drawings are exemplary and are used to explain the present invention and should not be construed as a limitation to the present invention.

The present invention is further described in connection with the attached drawings and embodiments.

Please refer to FIGS. 1-4, a damping rubber spring for an automobile suspension according to the present invention comprises metal partition layers 1 and rubber layers 2, wherein two outermost metal partition layers are an upper partition layer 4 and a lower partition layer 5 respectively, and the upper partition layer 4 and the lower partition layer 5 are arranged in parallel. An m-th rubber layer starting from the upper partition layer has a thickness that is the same as that of an m-th rubber layer starting from the lower partition layer. Advantageously, a center rubber layer has a thickness that is larger than those of other rubber layers. As can be understood by those skilled in the art, in the present invention, the center rubber layer may comprise only one rubber layer when the number of all rubber layers is odd, and the center rubber layer may comprise two rubber layers when the number of all rubber layers is even.

Figure 2:
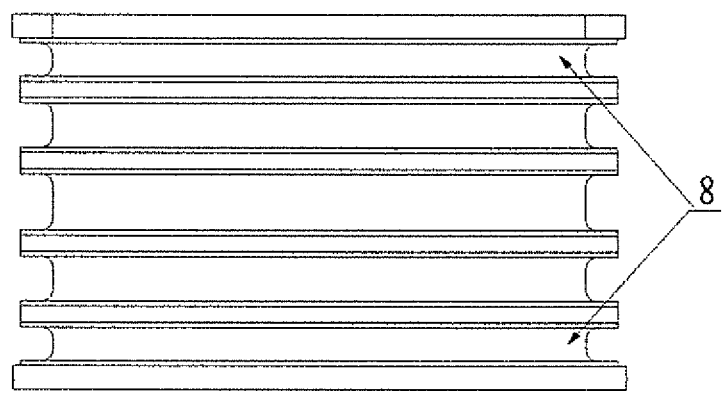
FIG. 2 is a left side view showing the damping rubber spring for an automobile suspension of FIG. 1.
Figure 3:
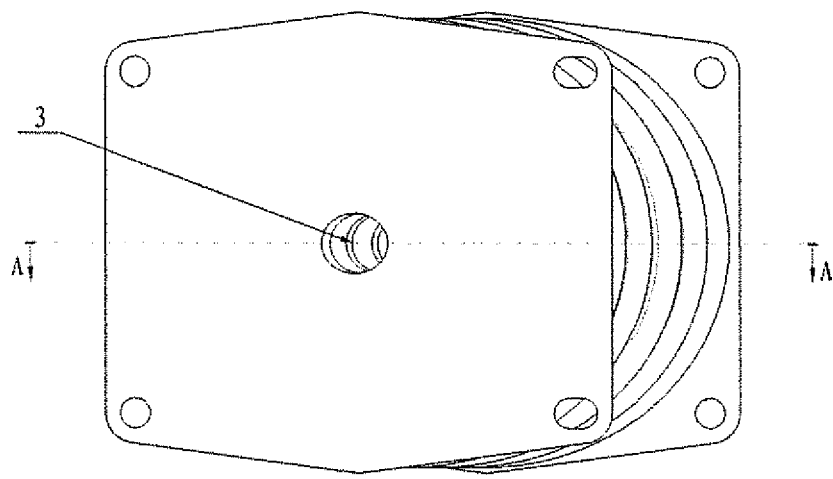
FIG. 3 is a top view showing the damping rubber spring for an automobile suspension of FIG. 1 in an axial direction.

When the number of all rubber layers is odd, the thickness of the center rubber layer 7 is larger than those of other rubber layers, as shown in FIGS. 1-2. Also, as shown in FIGS. 1-2, the thicknesses of rubber layers on the upper and lower sides of the center rubber layer 7 gradually decrease towards the upper partition layer and the lower partition layer respectively. As shown in FIGS. 1-4, each rubber layer in the damping rubber spring for an automobile suspension has the same cross section, there are 5 rubber layers, the thickness of the center layer is 30 mm, and a difference between the thicknesses of adjacent two rubber layers is 5 mm.

Alternatively, although not shown in the drawings, when the number of the rubber layers is even, two center rubber layers have the same thickness, which is larger than those of other rubber layers. Similarly, the thicknesses of rubber layers on the upper and lower sides of the two center rubber layers gradually decrease towards the upper partition layer and the lower partition layer respectively.

A difference ratio between the thicknesses of adjacent two rubber layers does not exceed 30%.

As shown in FIGS. 1-2, the cross section areas of all the rubber layers may be the same. Obviously, the cross section area discussed herein refers to the cross section area of a rubber layer in a plane in parallel with the plane of the upper partition layer in FIG. 1.

Figure 5:
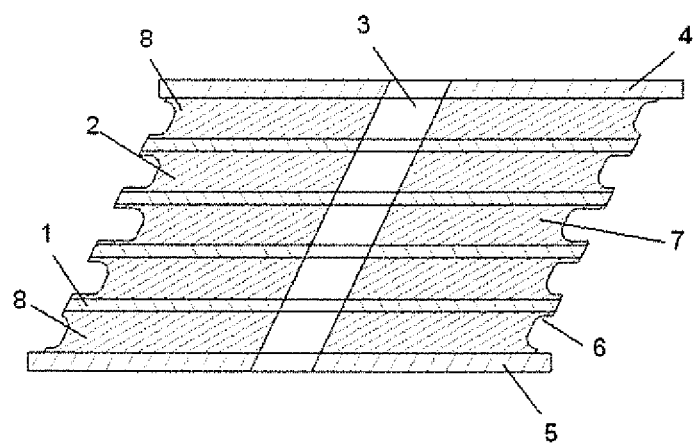
FIG. 5 is a sectional view showing a damping rubber spring for an automobile suspension according to another embodiment of the present invention.

The present invention further provides another damping rubber spring for an automobile suspension. As shown in FIG. 5, the damping rubber spring for an automobile suspension comprises: n rubber layers 2, where n is a natural number not less than 3; n+1 metal partition layers 1, wherein the n+1 metal partition layers comprise an upper partition layer 4 located at an uppermost position of the damping rubber spring for an automobile suspension and a lower partition layer 5 located at a lowermost position of the damping rubber spring for an automobile suspension, the n rubber layers and the n+1 metal partition layers are laminated alternately with each other, and the upper partition layer is in parallel with the lower partition layer, wherein an m-th rubber layer starting from the upper partition layer has a cross section area that is the same as that of an m-th rubber layer starting from the lower partition layer, where m is a natural number smaller than n. Furthermore, the rubber layer adjacent to the upper partition layer and the rubber layer adjacent to the lower partition layer have the same cross section area, which is larger than those of other rubber layers, as shown in FIG. 5. When the number of the rubber layers is odd, the cross section area of the center rubber layer 7 is smaller than those of other rubber layers. Advantageously, the cross section areas of rubber layers gradually increase towards corresponding upper and lower partition layers respectively from the center rubber layer 7. As shown in FIG. 5, there are 5 rubber layers, the thickness of each rubber layer is 20 mm. the cross section area of the center layer (the third layer) is the smallest, the cross section areas of the second layer and the fourth layer are the same and larger than that of the center layer by 8%, and the cross section areas of the first layer and the fifth layer are the same and larger than that of the second (or the fourth) layer by 8%.

Although not shown in the drawings, when the number of the rubber layers is even, two center rubber layers have the same cross section area, which is smaller than those of other rubber layers. Optionally, the cross section areas of rubber layers gradually increase towards corresponding upper and lower partition layers respectively from the two center rubber layers.

Optionally, a difference ratio between the cross section areas of adjacent two rubber layers does not exceed 30%.

In the example shown in FIG. 5, the thicknesses of respective rubber layers are the same.

Additionally, at least one rubber layer may be provided with an axial hole to improve fatigue resistance performance of the spring. In other words, some of the rubber layers may be provided with axial holes, some of the rubber layers may not be provided with axial holes, or all the rubber layers may be provided with axial holes. In addition, positions or number of the axial holes is not limited herein. The term "axial" used herein indicates a direction along the axis L shown in FIGS. 4-5.

Figure 4:
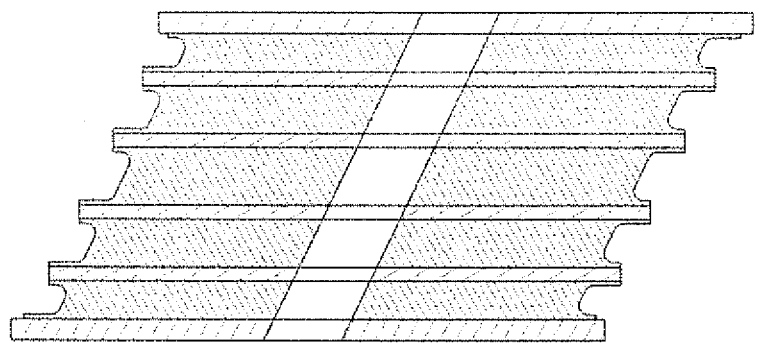
FIG. 4 is a sectional view showing the damping rubber spring for an automobile suspension along the line A-A of FIG. 3.

The axial hole may extend through at least one metal partition layer. The axial hole 3 may comprises a through hole that extends through all the metal partition layers and the rubber layers, as shown in FIGS. 4-5. Advantageously, the cross section normal to an axis of the axial hole 3 is in a shape of a circle, and a ratio between the diameter of the circle and the diameter of the smallest cross section of all the rubber layers normal to the axis is not larger than 0.3.

In the damping rubber spring for an automobile suspension of the present invention, a connecting edge between the rubber layer and the metal partition layer is provided with a transitional chamfer, and the transitional chamfer may be a rounded chamfer, a straight chamfer, or a smooth transitional chamfer. An extending length of a curve of a transitional section of the transitional chamfer formed in a cross section is in a range from 0.5 mm to 20 mm, so as to reduce a stress at a bonding position between a rubber and a metal and improve the service life of the spring.

In the example shown in FIGS. 1-4, the diameter of the through hole is 30 mm, the transitional chamfer is a rounded chamfer, and a radius of the rounded chamber is 6 mm.

In the example shown in FIG. 5, the diameter of the through hole is 20 mm, the transitional chamfer is a smooth transitional chamfer, and a size of the smooth transitional chamber is 8 mm.

Figure 6:
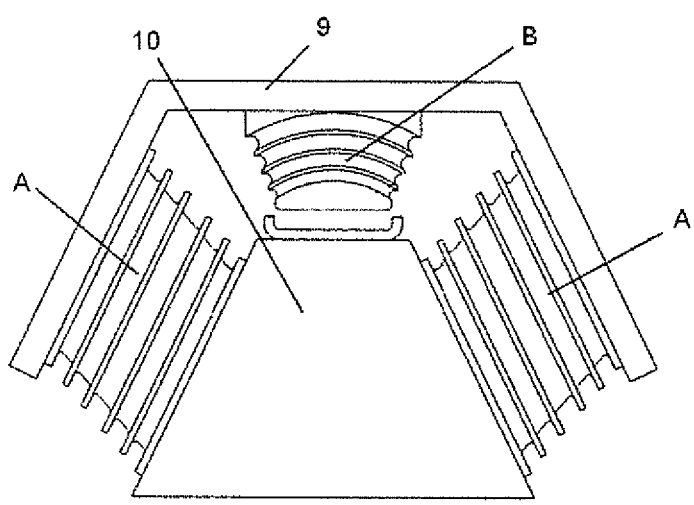
FIG. 6 is a schematic view showing an assembly in which the damping rubber spring for an automobile suspension according to the present invention is used.

FIG. 6 is a schematic view showing an assembly in which the damping rubber spring for an automobile suspension according to the present invention is used. As shown in FIG. 6, one auxiliary rubber spring for an automobile suspension B and two damping rubber springs for an automobile suspension A according to the above embodiments of the present invention are connected between a suspension mount 9 and a balance beam 10.

Preferable embodiments of the present invention have been described in detail, and those skilled would appreciate that various changes or modifications may be made without departing from the scope and spirit of attached claims, and the present invention is not limited to the exemplary embodiments described in the specification.

What is claimed is:

1. A damping rubber spring for an automobile suspension, comprising:
   n rubber layers, n being a natural number not less than 3;
   n+1 metal partition layers comprising an upper partition layer located at an uppermost position of the damping rubber spring for an automobile suspension and a lower partition layer located at a lowermost position of the damping rubber spring for an automobile suspension, the n rubber layers and the n+1 metal partition layers being laminated alternately with each other, the upper partition layer being disposed in parallel with the lower partition layer and each of the n rubber layers being sandwiched between two adjacent metal partition layers;
   an m-th rubber layer starting from the upper partition layer has a thickness that is the same as that of an m-th rubber layer starting from the lower partition layer, m being a natural number smaller than n, and
   in a direction from the upper partition layer to the lower partition layer, the thickness of a mid-layer of the n rubber layers which is adjacent to the midpoint of a distance between the upper and lower partition layers is larger than those of the layers of the n rubber layers which are adjacent to the upper or lower partition layers, and in a direction parallel to a plane in which the upper or lower partition layer lies, the area of the middle section of the mid-layers of the n rubber layers which are adjacent to the midpoint of a distance between the upper and lower partition layers is smaller than those of the layers of the n rubber layers which are adjacent to the upper or lower partition layers.

2. The damping rubber spring for an automobile suspension according to claim 1, wherein n is an odd number, the thickness of the mid-layer of the n rubber layers is larger than those of other rubber layers.

3. The damping rubber spring for an automobile suspension according to claim 2, wherein the thicknesses of rubber layers on the upper and lower sides of the rubber mid-layer gradually decrease towards the upper partition layer and the lower partition layer respectively.

4. The damping rubber spring for an automobile suspension according to claim 1, wherein n is an even number, at least two of the rubber mid-layers having the same thickness and being larger than those of other rubber layers.

5. The damping rubber spring for an automobile suspension according to claim 4, wherein the thicknesses of rubber layers on the upper and lower sides of the two rubber mid-layers gradually decrease towards the upper partition layer and the lower partition layer respectively.

6. The damping rubber spring for an automobile suspension according to claim 3, wherein a difference ratio between the thicknesses of adjacent two rubber layers does not exceed 30%.

7. The damping rubber spring for an automobile suspension according to claim 1, wherein all the rubber layers have the same cross section area.

8. The damping rubber spring for an automobile suspension according to claim 1, wherein an m-th rubber layer starting from the upper partition layer has a cross section area that is the same as that of an m-th rubber layer starting from the lower partition layer, where m is a natural number smaller than n.

9. The damping rubber spring for an automobile suspension according to claim 8, wherein the cross section areas of rubber layers gradually increase towards corresponding upper and lower partition layers respectively from a rubber mid-layer.

10. The damping rubber spring for an automobile suspension according to claim 1, wherein a connecting edge between the rubber layer and the metal partition layer is provided with a transitional chamfer.

11. A damping rubber spring for an automobile suspension, comprising:
   n rubber layers, n being a natural number not less than 3;
   n+1 metal partition layers comprising an upper partition layer located at an uppermost position of the damping rubber spring for an automobile suspension and a lower partition layer located at a lowermost position of the damping rubber spring for an automobile suspension, the n rubber layers and the n+1 metal partition layers being laminated alternately with each other, and the upper partition layer being disposed in parallel with the lower partition layer, and each of the n rubber layers being sandwiched between two adjacent metal partition layers; and
   an m-th rubber layer starting from the upper partition layer having a cross section area that is the same as that of an m-th rubber layer starting from the lower partition layer, m being a natural number smaller than n,
   in a direction from the upper partition layer to the lower partition layer, the thickness of a mid-layer of the n rubber layers which is adjacent to the midpoint of a distance between the upper and lower partition layers is larger than those of the layers of the n rubber layers which are adjacent to the upper or lower partition layers, and in a direction parallel to a plane in which the upper or lower partition layer lies, the area of the middle section of the mid-layers of the n rubber layers which are adjacent to the midpoint of a distance between the upper and lower partition layers is smaller than those of the layers of the n rubber layers which are adjacent to the upper or lower partition layers.

12. The damping rubber spring for an automobile suspension according to claim 11, wherein the rubber layer adjacent to the upper partition layer and the rubber layer adjacent to the lower partition layer have the same cross section area which is larger than those of other rubber layers.

13. The damping rubber spring for an automobile suspension according to claim 12, wherein n is an odd number, the cross section area of a rubber mid-layer in the n rubber layers is smaller than those of other rubber layers.

14. The damping rubber spring for an automobile suspension according to claim 13, wherein the cross section areas of rubber layers gradually increase towards corresponding upper and lower partition layers respectively from the rubber mid-layer.

15. The damping rubber spring for an automobile suspension according to claim 12, wherein n is an even number, two rubber mid-layers have the same cross section area which is smaller than those of other rubber layers.

16. The damping rubber spring for an automobile suspension according to claim 15, wherein the cross section areas of rubber layers gradually increase towards corresponding upper and lower partition layers respectively from the two rubber mid-layers.

17. The damping rubber spring for an automobile suspension according to claim 14, wherein a difference ratio between the cross section areas of adjacent two rubber layers does not exceed 30%.

18. The damping rubber spring for an automobile suspension according to claim 11, wherein the thicknesses of all the rubber layers are the same.

19. The damping rubber spring for an automobile suspension according to claim 1, wherein at least one rubber layer is provided with an axial hole.

20. The damping rubber spring for an automobile suspension according to claim 19, wherein the axial hole extends through at least one metal partition layer.

21. The damping rubber spring for an automobile suspension according to claim 20, wherein the axial hole extends through all the metal partition layers and the rubber layers.

22. The damping rubber spring for an automobile suspension according to claim 21, wherein an axis of the axial hole extends through geometrical centers of each metal partition layer and each rubber layer, the cross section normal to the axis of the axial hole is in a shape of circle, and a ratio between the diameter of the circle and the diameter of the smallest cross section of all the rubber layers normal to the axis is not larger than 0.3.

* * * * *